UNITED STATES PATENT OFFICE.

GIBSON SMITH, OF AYER, MASSACHUSETTS.

IMPROVEMENT IN HAIR RESTORING AND COLORING COMPOUNDS.

Specification forming part of Letters Patent No. 130,160, dated August 6, 1872.

*To all whom it may concern:*

Be it known that I, GIBSON SMITH, of Ayer, in the county of Middlesex and State of Massachusetts, have invented certain new and useful Improvements in Compounds for Coloring and Preserving the Human Hair; and I do hereby declare that the following is a full, clear, and exact description thereof.

I obtained, on March the 23d, 1869, Letters Patent of the United States for an improved compound for imparting a dark shade to faded or blanched hair, and for preserving and restoring it when prematurely fallen off. Also, on February 1st, 1870, I obtained Letters Patent of the United States for an improvement of said compound, which improvement consisted in the addition of glycerine, and which served to render the hair more soft and glossy. Since the issue of said patents I have discovered an important auxiliary to this compound, the effect of which is to readily color gray hair brown or black, according to the original color of the hair.

To enable others skilled in the art to make my improved compound, which I have named "Improved Nature's Hair-Restorative," I will now proceed to describe how the same should be made.

I use, by weight, one ounce of hyposulphite of soda dissolved in thirteen ounces of soft water, two drams of carbonate of ammonia dissolved in thirteen ounces of soft water, and two drams of sulphate of protoxide of manganese dissolved in thirteen ounces of soft water—these ingredients to be prepared in separate vessels; and when thoroughly dissolved filter and mix them together, and add two ounces of pure glycerine, and it is ready for use. The carbonate of ammonia is designed to hold the sulphate of manganese in solution; otherwise the hyposulphite of soda would cause its precipitation in the form of a black powder in the mixture.

I do not wish to confine myself simply to the proportions given above; but

What I claim, and desire to secure by Letters Patent, is—

The combination of hyposulphite of soda, carbonate of ammonia, sulphate of protoxide of manganese, and glycerine, substantially for the purpose set forth.

In testimony that I claim the foregoing as my own I affix my signature in the presence of two witnesses.

GIBSON SMITH.

Witnesses:
    LEVI SHERWIN,
    CHARLES SHERWIN.